United States Patent
Lipscomb et al.

(10) Patent No.: US 9,475,967 B2
(45) Date of Patent: Oct. 25, 2016

(54) ADHESIVES COMPRISING CROSSLINKER WITH (METH)ACRYLATE GROUP AND OLEFIN GROUP AND METHODS

(71) Applicant: 3M INNOVATIVE PROPERTIES COMPANY, St. Paul, MN (US)

(72) Inventors: Corinne E. Lipscomb, St. Paul, MN (US); Duane D. Fansler, Dresser, WI (US); Kevin M. Lewandowski, Inner Grove Heights, MN (US); Jonathan E. Janoski, Woodbury, MN (US); Jayshree Seth, Woodbury, MN (US); Arlin L. Weikel, Roberts, WI (US); John W. Vanderzanden, Maplewood, MN (US)

(*) Notice: Subject to any disclaimer, the term of this patent is extended or adjusted under 35 U.S.C. 154(b) by 0 days.

(21) Appl. No.: 14/767,732

(22) PCT Filed: Apr. 11, 2014

(86) PCT No.: PCT/US2014/033712
§ 371 (c)(1),
(2) Date: Aug. 13, 2015

(87) PCT Pub. No.: WO2014/172185
PCT Pub. Date: Oct. 23, 2014

(65) Prior Publication Data
US 2016/0017187 A1    Jan. 21, 2016

Related U.S. Application Data

(60) Provisional application No. 61/811,982, filed on Apr. 15, 2013.

(51) Int. Cl.
*C08F 20/10*  (2006.01)
*B05D 3/02*  (2006.01)
(Continued)

(52) U.S. Cl.
CPC ............. *C09J 133/08* (2013.01); *B05D 1/42* (2013.01); *B05D 3/067* (2013.01); *C08K 3/36* (2013.01);
(Continued)

(58) Field of Classification Search
CPC .......... C09J 133/08; C08K 3/36; C08K 7/28; B05D 1/42; B05D 3/067
USPC ............. 526/318.4; 427/385.5, 487; 524/556
See application file for complete search history.

(56) References Cited

U.S. PATENT DOCUMENTS 2,456,647 A    12/1948    Rehberg
RE24,406 E    12/1957    Wier
(Continued)

FOREIGN PATENT DOCUMENTS

EP    0084220    7/1983
EP    0259094    3/1988
(Continued)

OTHER PUBLICATIONS

3M™,"Microspheres Selection Guide", 2013, 4 pages.
(Continued)

*Primary Examiner* — William Cheung

(57) ABSTRACT

A pressure sensitive adhesive composition is described comprising at least 50 wt-% of polymerized units derived from alkyl meth(acrylate) monomer(s); and 0.2 to 15 wt-% of at least one cross-linking monomers comprising a (meth) acrylate group and a $C_6$-$C_{20}$ olefin group, the olefin group being optionally substituted. In another embodiment, an adhesive composition is described comprising a syrup comprising i) a free-radically polymerizable solvent monomer; and ii) a solute (meth)acrylic polymer comprising polymerized units derived from one or more alkyl (meth)acrylate monomers; wherein the syrup comprises at least one crosslinking monomer or the (meth)acrylic solute polymer comprises polymerized units derived from at least one crosslinking monomer, the crosslinking monomer comprising a (meth)acrylate group and a $C_6$-$C_{20}$ olefin group, the olefin group being optionally substituted. In yet other embodiments, methods of preparing adhesive compositions are described.

22 Claims, 1 Drawing Sheet

(51) Int. Cl.
| | |
|---|---|
| C08F 2/46 | (2006.01) |
| C08L 31/00 | (2006.01) |
| C09J 133/08 | (2006.01) |
| C09J 7/02 | (2006.01) |
| B05D 1/42 | (2006.01) |
| B05D 3/06 | (2006.01) |
| C08K 3/36 | (2006.01) |
| C08K 7/28 | (2006.01) |

(52) U.S. Cl.
CPC ............... *C08K 7/28* (2013.01); *C09J 7/0217* (2013.01); *C08L 2312/06* (2013.01); *C09J 2205/31* (2013.01); *C09J 2433/00* (2013.01); *Y10T 428/1452* (2015.01)

(56) References Cited

U.S. PATENT DOCUMENTS

| | | | |
|---|---|---|---|
| 4,000,958 | A | 1/1977 | Hirooka |
| 4,181,752 | A | 1/1980 | Martens |
| 4,234,662 | A | 11/1980 | Pastor |
| 4,303,485 | A | 12/1981 | Levens |
| 4,330,590 | A | 5/1982 | Vesley |
| 4,415,615 | A | 11/1983 | Esmay |
| 4,429,384 | A | 1/1984 | Kaplinsky |
| 4,576,999 | A | 3/1986 | Eckberg |
| 4,818,610 | A | 4/1989 | Zimmerman |
| 4,987,186 | A * | 1/1991 | Akiyama .......... C08G 18/6225 525/107 |
| 5,225,473 | A | 7/1993 | Duan |
| 5,416,127 | A | 5/1995 | Chandran |
| 5,506,279 | A | 4/1996 | Babu |
| 5,534,391 | A | 7/1996 | Wang |
| 5,602,221 | A | 2/1997 | Bennett |
| 5,741,543 | A | 4/1998 | Winslow |
| 5,879,759 | A | 3/1999 | Zang |
| 5,902,836 | A | 5/1999 | Bennett |
| 6,060,207 | A | 5/2000 | Shida |
| 6,150,479 | A | 11/2000 | Klemarczyk |
| 6,586,510 | B1 | 7/2003 | Brown |
| 6,780,951 | B2 | 8/2004 | Pourreau |
| 6,852,781 | B2 | 2/2005 | Savu |
| 6,893,731 | B2 | 5/2005 | Kausch |
| 7,175,898 | B2 | 2/2007 | Luhmann |
| 7,385,020 | B2 | 6/2008 | Anderson |
| 7,652,103 | B2 | 1/2010 | Kavanagh |
| 7,714,076 | B2 | 5/2010 | Krepski |
| 7,781,056 | B2 | 8/2010 | Bries |
| 8,067,504 | B2 | 11/2011 | Erdogan |
| 8,137,807 | B2 | 3/2012 | Clapper |
| 8,148,471 | B2 | 4/2012 | Kavanagh |
| 8,222,340 | B2 | 7/2012 | Erdogan-Haug |
| 8,263,711 | B2 | 9/2012 | Krepski |
| 8,338,536 | B2 | 12/2012 | Nguyen |
| 8,349,962 | B2 | 1/2013 | Erdogan |
| 2001/0021739 | A1 * | 9/2001 | Thames ............. C09D 133/062 524/400 |
| 2004/0192831 | A1 | 9/2004 | Chen |
| 2004/0265529 | A1 | 12/2004 | Luhmann |
| 2009/0026934 | A1 | 1/2009 | Fujita |
| 2010/0240923 | A1 | 9/2010 | Haering |
| 2011/0033699 | A1 | 2/2011 | Hayashi |
| 2012/0154811 | A1 | 6/2012 | Pokorny |
| 2012/0288692 | A1 | 11/2012 | Broyles |

FOREIGN PATENT DOCUMENTS

| | | |
|---|---|---|
| EP | 0372756 | 6/1990 |
| EP | 0419283 | 3/1991 |
| EP | 2257577 | 8/2010 |
| GB | 624764 | 6/1949 |
| JP | 7-228858 | 8/1995 |
| JP | 2001-354749 | 12/2001 |
| WO | WO 96-31564 | 10/1996 |
| WO | WO 00-04055 | 1/2000 |
| WO | WO 00-31149 | 6/2000 |
| WO | WO 03-078117 | 9/2003 |
| WO | WO 2004-092295 | 10/2004 |
| WO | WO 2005-110737 | 11/2005 |
| WO | WO 2008-057926 | 5/2008 |
| WO | WO 2009-068098 | 6/2009 |
| WO | WO 2009-102623 | 8/2009 |
| WO | WO 2011-068754 | 6/2011 |
| WO | WO 2011-094385 | 8/2011 |
| WO | WO 2012-161997 | 11/2012 |
| WO | WO 2012-168208 | 12/2012 |
| WO | WO 2012-177337 | 12/2012 |
| WO | WO 2013-048945 | 4/2013 |
| WO | WO 2014-037654 | 3/2014 |
| WO | WO 2014-186265 | 11/2014 |

OTHER PUBLICATIONS

Evonik, "AEROSIL® R 972, Hydrophobic Fumed Silica", Feb. 2008, 2 pages.

Frostick, "Synthesis of Some Epoxy Vinyl Monomers by Epoxidation with Peracetic Acid", Journal of the American Chemical Society, Jul. 5, 1959, vol. 81, pp. 3350-3356.

Heatley, "NMR studies of free-radical polymerization and copolymerization of monomers and polymers containing allyl groups", European Polymer Journal, Feb.-Mar. 1993, vol. 29, No. 2-3, pp. 255-268.

Goldring, "Synthesis of Macrocyclic Lactams and Lactones via Ring-Closing Olefin Metathesis", Tetrahedron Letters, 1998, vol. 39, No. 28, pp. 4955-4958.

Krasovskiy, "Highly Efficient Reagents for Br/Mg Exchange", Angewandte Chemie, International Edition, 2006, vol. 45, pp. 159-162.

Marvel, "Polyalkylene Sulfides. X. The Reaction of Hexamethylenedithiol with 1,3-Butadiene", Journal of Polymer Science, Mar. 1952, vol. 8, No. 3, pp. 313-320.

Matsumoto, "Polymerization of multiallyl monomers", Progress in Polymer Science, 2001, vol. 26, pp. 189-257.

Rehberg, "Preparation and Polymerization of Acrylic Esters of Olefinic Alcohols", Journal of Organic Chemistry, Mar. 1947, vol. 12, No. 2, pp. 226-231.

International Search Report for PCT International Application No. PCT/US2014/033712 mailed on Jul. 28, 2014, 3 pages.

* cited by examiner

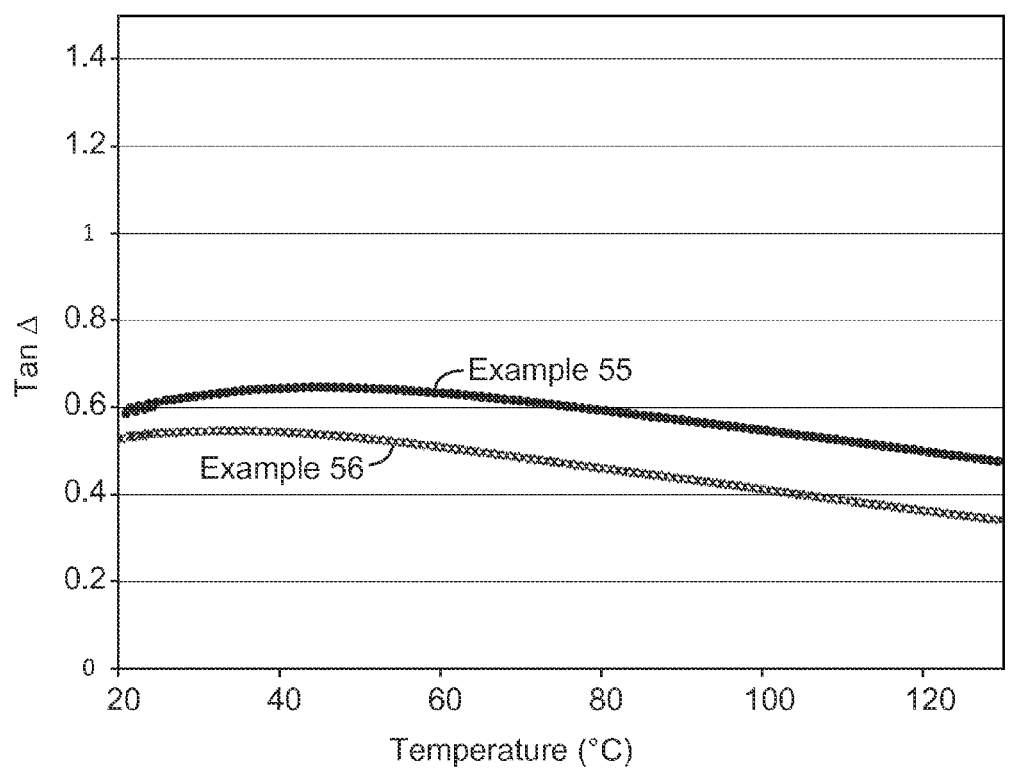

US 9,475,967 B2

ADHESIVES COMPRISING CROSSLINKER WITH (METH)ACRYLATE GROUP AND OLEFIN GROUP AND METHODS

This application is the U.S. National Stage of International Application PCT/US2014/23912, filed Jan. 30, 2013, which was published as WO 2013/033712 on Apr. 11, 2014; which claims the priority benefit of U.S. provisional application 61/811,982, filed Apr. 15, 2013. The US and PCT applications are hereby incorporated herein by reference in their entirety for all purposes.

BACKGROUND

As described in WO 2012/177337, there are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of undesirable color; requirement of a separate photoactive compound to initiate the crosslinking reaction; and high sensitivity to oxygen. A particular issue for the electronics industry and other applications in which PSAs contact a metal surface is the generation of corrosive by-products and the generation of undesirable color.

BRIEF DESCRIPTION OF THE DRAWINGS

FIG. 1 depicts the tan delta, the ratio of the shear loss modulus (G") to the shear storage modulus (G'), as determined by dynamic mechanical analysis.

SUMMARY

Thus, industry would find advantage in alternative crosslinkers for (e.g. pressure sensitive) adhesives.

In one embodiment, a pressure sensitive adhesive composition is described comprising at least 50 wt-% of polymerized units derived from alkyl meth(acrylate) monomer(s); and 0.2 to 15 wt-% of at least one crosslinking monomer comprising a (meth)acrylate group and a $C_6$-$C_{20}$ olefin group, the olefin group being straight-chained or branched and optionally substituted.

In another embodiment, a pressure sensitive adhesive composition is described comprising at least 50 wt-% of polymerized units derived from alkyl meth(acrylate) monomer(s); and 0.2 to 15 wt-% of at least one crosslinking monomer comprising a (meth)acrylate group and a cyclic $C_6$-$C_8$ olefin group, the olefin group being optionally substituted.

In another embodiment, an adhesive composition is described comprising a syrup comprising i) a free-radically polymerizable solvent monomer; and ii) a solute (meth)acrylic polymer comprising polymerized units derived from one or more alkyl(meth)acrylate monomers; wherein the syrup comprises at least one crosslinking monomer or the (meth)acrylic solute polymer comprises polymerized units derived from at least one crosslinking monomer, the crosslinking monomer comprising a (meth)acrylate group and a $C_6$-$C_{20}$ olefin group, the olefin group being straight-chained, branched, or cyclic and optionally substituted.

In yet another embodiment, a method of preparing an adhesive composition is described comprising: a) providing a syrup comprising: i) a free-radically polymerizable solvent monomer; and ii) a solute (meth)acrylic polymer comprising polymerized units derived from one or more alkyl(meth) acrylate monomers, wherein the syrup comprises at least one crosslinking monomer or the (meth)acrylic solute polymer comprises polymerized units derived from at least one crosslinking monomer, the crosslinking monomer comprising a (meth)acrylate group and a $C_6$-$C_{20}$ olefin group, the olefin group being optionally substituted; and b) applying the syrup to a substrate; and c) irradiating the applied syrup thereby crosslinking the adhesive composition.

In yet another embodiment, a method of preparing an adhesive composition is described comprising: a) polymerizing in an organic solvent i) one or more alkyl meth (acrylate) monomer(s), and ii) a crosslinking monomer, the crosslinking monomer comprising a (meth)acrylate group and a $C_6$-$C_{20}$ olefin group, the olefin group being optionally substituted; and b) applying the solution of polymerized monomers to a substrate; and c) curing the solution thereby crosslinking the adhesive composition.

DETAILED DESCRIPTION

The present disclosure describes pressure sensitive adhesives (PSAs) prepared from crosslinkable (e.g. syrup) compositions, as well as articles. The crosslinked pressure-sensitive adhesives provide a suitable balance of tack, peel adhesion, and shear holding power. Further, the storage modulus of the pressure sensitive adhesive at the application temperature, typically room temperature (25° C.), is less than $3\times10^5$ dynes/cm at a frequency of 1 Hz. In some embodiments, the adhesive is a pressure sensitive adhesive at an application temperature that is greater than room temperature. For example, the application temperature may be 30, 35, 40, 45, 50, 55, or 65° C. In this embodiment, the storage modulus of the pressure sensitive adhesive at room temperature (25° C.) is typically less than $3\times10^6$ dynes/cm at a frequency of 1 Hz. In some embodiments, the storage modulus of the pressure sensitive adhesive at room temperature (25° C.) is less than $2\times10^6$ dynes/cm or $1\times10^6$ dynes/cm at a frequency of 1 Hz.

"Syrup composition" refers to a solution of a solute polymer in one or more solvent monomers, the composition having a viscosity from 100 to 8,000 cPs at 25° C. The viscosity of the syrup is greater than the viscosity of the solvent monomer(s).

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

The term olefin group refers to an unsaturated aliphatic straight-chained, branched, or cyclic (i.e. unsubstituted) hydrocarbon group having one or more double bonds. Those containing one double bond are commonly called alkenyl groups. In some embodiments, the cyclic olefin group comprises less than 10 or 8 carbon atoms, such as in the case of cyclohexenyl. In some embodiments, the olefin group may further comprise substituents as will subsequently be described. The olefin group is typically monovalent.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

When a group is present more than once in a formula described herein, each group is "independently" selected unless specified otherwise.

The adhesive comprises a (meth)acrylic polymer prepared from one or more monomers common to acrylic adhesives, such as a (meth)acrylic ester monomers (also referred to as (meth)acrylate acid ester monomers and alkyl(meth)acrylate monomers) optionally in combination with one or more other monomers such as acid-functional ethylenically unsaturated monomers, non-acid-functional polar monomers, and vinyl monomers.

The (meth)acrylic polymer comprises one or more (meth)acrylate ester monomers derived from a (e.g. non-tertiary) alcohol containing from 1 to 14 carbon atoms and preferably an average of from 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like. In some embodiments, a preferred (meth)acrylate ester monomer is the ester of (meth)acrylic acid with isooctyl alcohol.

In some favored embodiments, the monomer is the ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl(meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol. In some embodiments, the (e.g. pressure sensitive) adhesive composition (e.g. (meth)acrylic polymer and/or free-radically polymerizable solvent monomer) comprises a bio-based content of at least 25, 30, 35, 40, 45, or 50 wt-% using ASTM D6866-10, method B. In other embodiments, the (e.g. pressure sensitive) adhesive composition comprises a bio-based content of at least 55, 60, 65, 70, 75, or 80 wt-%. In yet other embodiments, the (e.g. pressure sensitive) adhesive composition comprises a bio-based content of at least 85, 90, 95, 96, 97, 99 or 99 wt-%.

The (e.g. pressure sensitive) adhesive (e.g. (meth)acrylic polymer and/or solvent monomer) comprises one or more low Tg (meth)acrylate monomers, having a $T_g$ no greater than 10° C. when reacted to form a homopolymer. In some embodiments, the low Tg monomers have a $T_g$ no greater than 0° C., no greater than –5° C., or no greater than –10° C. when reacted to form a homopolymer. The $T_g$ of these homopolymers is often greater than or equal to –80° C., greater than or equal to –70° C., greater than or equal to –60° C., or greater than or equal to –50° C. The $T_g$ of these homopolymers can be, for example, in the range of –80° C. to 20° C., –70° C. to 10° C., –60° C. to 0° C., or –60° C. to –10° C.

The low Tg monomer may have the formula

$$H_2C=CR^1C(O)OR^8$$

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the (e.g. pressure sensitive) adhesive (e.g. (meth)acrylic polymer and/or free radically polymerizable solvent monomer) comprises low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl methacrylate, isooctyl methacrylate, n-octyl methacrylate, 2-octyl methacrylate, isodecyl methacrylate, and lauryl methacrylate. Likewise, some heteroalkyl methacrylates such as 2-ethoxy ethyl methacrylate can also be used.

In some embodiments, the (e.g. pressure sensitive) adhesive (e.g. (meth)acrylic polymer and/or solvent monomer) comprises a high $T_g$ monomer, having a $T_g$ greater than 10° C. and typically of at least 15° C., 20° C. or 25° C., and preferably at least 50° C. Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl(meth)acrylate, benzyl methacrylate, 3,3,5 trimethylcyclohexyl acrylate, cyclohexyl acrylate, N-octyl acrylamide, and propyl methacrylate or combinations.

In some embodiments, the (meth)acrylic polymer is a homopolymer. In other embodiments, the (meth)acrylic polymer is a copolymer. Unless specified otherwise, the term polymer refers to both a homopolymer and copolymer.

The $T_g$ of the copolymer may be estimated by use of the Fox equation, based on the $T_g$s of the constituent monomers and the weight percent thereof.

The alkyl(meth)acrylate monomers are typically present in the (meth)acrylic polymer in an amount of at least 85, 86, 87, 88, 89, or 90 up to 95, 96, 97, 98, or 99 parts by weight, based on 100 parts by weight of the total monomer or polymerized units. When high $T_g$ monomers are included in a pressure sensitive adhesive, the adhesive may include at least 5, 10, 15, 20, to 30 parts by weight of such high Tg monomer(s). When the (e,g. pressure sensitive) adhesive composition is free of unpolymerized components, such as tackifier, silica, and glass bubbles, the parts by weight of the total monomer or polymerized units is approximately the same as the wt-% present in the total adhesive composition. However, when the (e.g. pressure sensitive) adhesive composition comprises such unpolymerized components, the (e.g. pressure sensitive) adhesive composition can comprises substantially less alkyl(meth)acrylate monomer(s) and crosslinking monomer. The (e.g. pressure sensitive) adhesive composition comprises at least 50 wt-% of polymerized units derived from alkyl(meth)acrylate monomers. In some embodiments, the pressure sensitive adhesive composition comprises at least 50, 55, 60, 65, 70, 75, 80, 85, or 90 parts by weight, based on 100 parts by weight of the total monomer (or wt-% of the total adhesive composition) of one or more low Tg monomers. For embodied methods wherein the adhesive is not a pressure sensitive adhesive, the adhesive may comprise 50, 55, 60, 65, 70, 75, 80, 85, or 90 parts by weight, based on 100 parts by weight of the total monomer (or wt-% of the total adhesive composition) of one or more high Tg monomers. The (meth)acrylic polymer may optionally comprise an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In some embodiments, the acid functional monomer is generally used in amounts of 0.5 to 15 parts by weight, preferably 0.5 to 10 parts by weight, based on 100 parts by weight total monomer or polymerized units. In some embodiments, the (meth)acrylic polymer and/or PSA comprises less than 1.0, 0.9, 0.8, 0.7, 0.6, 0.5, 0.4, 0.3, 0.2, 0.1 or 0 wt-% of polymerized units derived from acid-functional monomers such as acrylic acid.

The (meth)acrylic copolymer may optionally comprise other monomers such as a non-acid-functional polar monomer.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The non-acid-functional polar monomer may be present in amounts of 0 to 10 or 20 parts by weight, or 0.5 to 5 parts by weight, based on 100 parts by weight total monomer. In some embodiments, the (meth)acrylic polymer and/or PSA comprises less than 1.0, 0.9, 0.8, 0.7, 0.6, 0.5, 0.4, 0.3, 0.2, 0.1 or 0 wt-% of polymerized units derived from non-acid polar monomers.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer or polymerized units. In some embodiments, the (meth)acrylic polymer and/or PSA comprises less than 1.0, 0.9, 0.8, 0.7, 0.6, 0.5, 0.4, 0.3, 0.2, 0.1 or 0 wt-% of polymerized units derived from vinyl monomers.

In some embodiments, the polymer contains no allyl ether, vinyl ether or vinyl ester monomer units.

The adhesive further comprises a crosslinking monomer comprising a (meth)acrylate group and a $C_6$-$C_{20}$ olefin group. The olefin group comprises at least one hydrocarbon unsaturation. In some embodiments, the olefin group comprises substitutents. The crosslinking monomer may have the formula

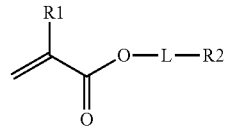

R1 is H or $CH_3$,
L is an optional linking group; and
R2 is a $C_6$-$C_{20}$ olefin group, the olefin group being optionally substituted.

For embodiments wherein the crosslinking monomer comprises a (e.g. divalent) linking group, the linking group (i.e. L) typically has a molecular weight no greater than 1000 g/mole and in some embodiments no greater than 500 g/mole, 400 g/mole, 300 g/mole, 200 g/mole, 100 g/mole, or 50 g/mole.

In some embodiments, the crosslinking monomer comprises a (meth)acrylate group and an optionally substituted $C_6$-$C_{20}$ olefin group comprising a terminal hydrocarbon unsaturation. In this embodiment the hydrocarbon unsaturation has the formula:

wherein $R^4$ and $R^5$ are H and $R^3$ is H or (e.g. $C_1$-$C_4$) alkyl. Undecenyl(meth)acrylate includes such terminal unsaturation.

In other embodiments, the crosslinking monomer comprises a (meth)acrylate group and an optionally substituted $C_6$-$C_{20}$ olefin group comprising at least one hydrocarbon unsaturation in the backbone of the optionally substituted $C_6$-$C_{20}$ olefin group. In this embodiment, the hydrocarbon unsaturation has the formula:

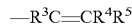

wherein $R^4$ and $R^5$ are independently alkyl and $R^3$ is H or (e.g. $C_1$-$C_4$) alkyl. In some embodiments, $R^4$ and $R^5$ are each methyl. In this embodiment, $R^4$ or $R^5$ is the terminal alkyl group of the $C_6$-$C_{20}$ olefin group. Citronellyl(meth)acrylate, geraniol (meth)acrylate and farnesol (meth)acrylate include a hydrocarbon unsaturation of this type.

In some embodiments, the crosslinking monomer comprises a (meth)acrylate group and an optionally substituted $C_6$-$C_{20}$ olefin group comprising two or more hydrocarbon unsaturations in the backbone. Some illustrative crosslinking monomers include for example geraniol (meth)acrylate (e.g. 3,7-dimethylocta-2,6-dienyl]prop-2-enoate) and farnesol (meth)acrylate (e.g. 3,7,11-trimethyldodeca-2,6,10-trienyl]prop-2-enoate).

In yet another embodiment of a hydrocarbon unsaturation in the backbone of the optionally substituted $C_6$-$C_{20}$ olefin group, $R^3$ and $R^4$ are independently H or (e.g. $C_1$-$C_4$) alkyl and $R^5$ is a terminal alkyl group having up to 18 carbon atoms. Oleyl(meth)acrylate includes a hydrocarbon unsaturation of this type.

In typical embodiments, the substituted $C_6$-$C_{20}$ olefin group does not comprise a carbonyl group. Thus, the (meth)acrylate group is the only group of the crosslinking monomer that comprises a carbonyl group. Thus, the crosslinking monomer is free of other groups that comprise a carbonyl such as an aldehyde, ketone, carboxylic acid, ester, amide, enone, acryl halide, acid anhydride, and imide. Hence, the crosslinking monomer comprises or consists of two types of polymerizable functional groups, i.e. a single (meth)acrylate group and one or more hydrocarbon unsaturations.

The optionally substituted $C_6$-$C_{20}$ olefin group may be a straight-chain, branched, or cyclic. Further, the hydrocarbon unsaturation may be at any position.

When the crosslinking monomer comprises a single hydrocarbon unsaturation, the unsubstituted $C_6$-$C_{20}$ olefin group may be characterized as an alkenyl group. In some embodiments, the alkenyl group has a straight chain. In some embodiments, the alkenyl group has branched chain, commonly comprising pendent methyl groups bonded to a straight chain.

Some illustrative crosslinking monomers comprising an alkenyl group include citronellyl(meth)acrylate, 3-cyclohexene methyl(meth)acrylate, undecenyl(meth)acrylate, and oleyl acrylate. Other $C_6$-$C_{20}$ alkenyl groups include 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl; 1,1-dimethyl-2-butenyl; 1,1-dimethyl-3-butenyl; 1,2-dimethyl-1-butenyl; 1,2-dimethyl-2-butenyl; 1,2-dimethyl-3-butenyl; 1,3-dimethyl-1-butenyl; 1,3-dimethyl-2-butenyl; 1,3-dimethyl-3-butenyl; 2,2-dimethyl-3-butenyl; 2,3-dimethyl-1-butenyl; 2,3-dimethyl-2-butenyl; 2,3-dimethyl-3-butenyl; 3,3-dimethyl-1-butenyl; 3,3-dimethyl-2-butenyl; 1,1,2-trimethyl-2-propenyl; and also the isomers of heptenyl, octenyl, and nonenyl.

Cyclic alkenyl groups included cyclohexenyl as well as dicyclopentenyl.

Provided that the $C_6$-$C_{20}$ olefin group comprises at least one hydrocarbon unsaturation, the $C_6$-$C_{20}$ olefin group may optionally comprise substituents. The substituents are chosen such that the crosslinking monomer comprises at least one hydrocarbon unsaturation available for crosslinking, as evident by a measurable and preferably substantial increase in shear values.

In some embodiments, the $C_6$-$C_{20}$ olefin group comprises pendent substituents. For example, when the $C_6$-$C_{20}$ olefin group comprises two or more hydrocarbon unsaturations, one or more of the additional hydrocarbon unsaturations can be reacted to append pendent substituents onto the $C_6$-$C_{20}$ olefin group backbone.

In other embodiments, the $C_6$-$C_{20}$ olefin group can comprise substituents such as a heteroatom (e.g. oxygen) or a (e.g. divalent) linking group (i.e. "L") between the (meth)acrylate group and $C_6$-$C_{20}$ olefin group. For example, the starting alcohol can be chain extended before reacting on the (meth)acrylate group. In some embodiments, the starting alcohol is chain extended with one or more alkylene oxide groups, such as ethylene oxide, propylene oxide, and combinations thereof. One illustrative crosslinking monomer of this type is the ester of (meth)acrylic acid of an ethoxylated and/or propoxylated unsaturated fatty alcohol. Some of such ethoxylated and/or propoxylated unsaturated fatty alcohols are commercially available as non-ionic surfactants. Thus, L comprises or consists of alkylene (e.g. ethylene) oxide repeat units. One illustrative fatty alcohol of this type is available from Croda as "Brij O2". Such ethoxylated alcohol comprises a mixture of molecules (wherein n is 1 or 2) having the general formula

The crosslinking monomers can be prepared by reacting the corresponding alcohol with acryloyl chloride, methylene chloride and triethylamine, or a combination thereof, such as set forth in the examples. The crosslinking monomers can also be prepared by direct esterification with acrylic acid.

The concentration of crosslinking monomer comprising a (meth)acrylate group and an optionally substituted $C_6$-$C_{20}$ olefin group is typically at least 0.1, 0.2, 0.3, 0.4 or 0.5 wt-% and can range up to 10, 11, 12, 13, 14, or 15 wt-% of the (e.g. pressure sensitive) adhesive composition. However, as the concentration of such crosslinking monomer increases, the peel adhesion (180° to stainless steel) can decrease. Thus, in typically embodiments, the concentration of crosslinking monomer comprising a (meth)acrylate group and an optionally substituted $C_6$-$C_{20}$ olefin group is no greater than 9, 8, 7, 6, or 5 wt-% and in some favored embodiments, no greater than 4, 3, 2, or 1 wt-%.

In some embodiments, the crosslinking monomer comprises a branched $C_6$-$C_{20}$ having less than 18, or 16, or 14, or 12 carbon atoms, such as in the case of citronellyl acrylate and geraniol acrylate. In this embodiment, a pressure sensitive adhesive can be obtained having high shear values (i.e. greater than 10,000 minutes at 70° C.) in combination with high adhesion with as little as 0.5 wt-% of such crosslinking monomer. As the chain length of the branched $C_6$-$C_{20}$ group increases, the amount of crosslinking monomer needed to provide the same number of crosslinks increases. For example, in the case of farnesol acrylate at least 0.7 wt-% or 0.8 wt-% resulted in high shear values. In the case of cyclic $C_6$-$C_{20}$ olefin groups, such as in the case of cyclohexane methyl acrylate, at least 2, 3, 4, or 5 wt-% resulted in high shear values. In the case of crosslinking monomers comprising a straight-chain $C_6$-$C_{20}$ such as in the case of undecenyl acrylate and oleyl acrylate, high shear values in combination with high adhesion was obtained with about 1 wt-%. Lower concentrations of undecenyl acrylate and optionally substituted oleyl acrylate are surmised to also provide a good balance of properties.

The (e.g. pressure sensitive) adhesive composition may comprise a single crosslinking monomer comprising a (meth)acrylate group and (optionally substituted) $C_6$-$C_{20}$ olefin group or a combination of two or more of such crosslinking monomers. Further, the crosslinking monomer may comprise two or more isomers of the same general structure.

In favored embodiments, the crosslinked adhesive composition comprises high shear values to stainless steel or orange peel drywall, i.e. greater than 10,000 minutes at 70° C., as determined according to the test methods described in the examples. The crosslinked pressure sensitive adhesive can exhibit a variety of peel adhesion values depending on the intended end use. In some embodiments, the 180° degree peel adhesion to stainless steel is least 15 N/dm. In other embodiments, the 180° degree peel adhesion to stainless steel is least 20, 25, 30, 35, 40, 45, 50, 55, 60, 65, 70, or 75 N/dm. The 180° degree peel adhesion to stainless steel is typically no greater than 150 or 100 N/dm. Such peel adhesive values are also attainable when adhered to other substrates.

In some embodiments, such as in the case of optionally substituted citronellyl(meth)acrylate and oleyl(meth)acrylate, the crosslinking monomer is a bio-based material. Thus, the use of such crosslinking monomer is amenable to increasing the total content of biobased material of the adhesive. Further, since the crosslinking monomer comprises an olefin group comprising at least 6 carbon atoms, when the hydrocarbon unsaturation does not crosslink, the crosslinking monomer can serve the function of a low Tg monomer. This can be amenable to utilizing higher concentrations of such crosslinking monomer. Further, the crosslinking monomer does not form corrosive by-products and has good color stability. In some embodiments, the b* of the adhesive after exposure to UV or heat, as described in greater detail in the test method described in the examples, is less than 1 or 0.9, or 0.8, or 0.7, or 0.6, or 0.5, or 0.4, or 0.3. In some embodiments, the b* of the adhesive after exposure to UV and heat, as described in greater detail in the test method described in the examples, is less than 2, or 1.5, or 1, or 0.9, or 0.8, or 0.7, or 0.6, or 0.5, or 0.4, or 0.3.

The (e.g. pressure sensitive) adhesive may optionally comprise another crosslinker in addition to the crosslinker having a (meth)acrylate group and optionally substituted $C_6$-$C_{20}$ olefin group. In some embodiments, the (e.g. pressure sensitive) adhesive comprises a multifunctional (meth)acrylate. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

Generally the multifunctional (meth)acrylate is not part of the original monomer mixture, but added subsequently after the formation of the (meth)acrylic polymer. If used, the multifunctional (meth)acrylate is typically used in an amount of at least 0.01, 0.02, 0.03, 0.04, or 0.05 up to 1, 2, 3, 4, or 5 parts by weight, relative to 100 parts by weight of the total monomer content.

In some embodiments, the (e.g. pressure sensitive) adhesive may further comprise a chlorinated triazine crosslinking compound. The triazine crosslinking agent may have the formula.

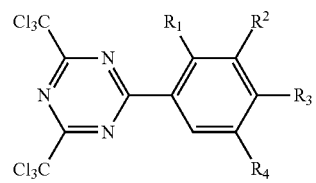

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In some embodiments, the (e.g. pressure sensitive) adhesive comprises predominantly (greater than 50%, 60%, 70%, 80%, or 90% of the total crosslinks) or exclusively crosslinks from the crosslinking monomer that comprises a (meth)acrylate group and an optionally substituted $C_6$-$C_{20}$ olefin group. In such embodiment, the (e.g. pressure sensitive) adhesive may be free of other crosslinking compounds, particularly aziridine crosslinkers, as well as multifunctional (meth)acrylate crosslinkers, chlorinated triazine crosslinkers and melamine crosslinkers.

The (meth)acrylic copolymers and adhesive composition can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free-radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the pressure sensitive adhesive.

The polymers prepared from solution polymerization have pendent unsaturated groups that can be crosslinked by a variety of methods. These include addition of thermal or photo initiators followed by heat or UV exposure after coating. The polymers may also be crosslinked by exposure to electron beam or gamma irradiation.

One method of preparing (meth)acrylic polymers includes partially polymerizing monomers to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth) acrylic polymer has been formed. Partial polymerization provides a coatable solution of the (meth)acrylic solute polymer in one or more free-radically polymerizable solvent monomers. The partially polymerized composition is then coated on a suitable substrate and further polymerized.

In some embodiments, the crosslinking monomer is added to the monomer(s) utilized to form the (meth)acrylic polymer. Alternatively or in addition thereto, the crosslinking monomer may be added to the syrup after the (meth)acrylic polymer has been formed. The (meth)acrylate group of the crosslinker and other (e.g. (meth)acrylate) monomers utilized to form the (meth)acrylic polymer preferentially polymerize forming an acrylic backbone with the pendent $C_6$-$C_{20}$ olefin group. Without intending to be bound by theory, it is surmised that at least a portion of the carbon-carbon double bonds of the pendent $C_6$-$C_{20}$ olefin group crosslink with each other during radiation curing of the syrup. Other reaction mechanisms may also occur.

The syrup method provides advantages over solvent or solution polymerization methods; the syrup method yielding higher molecular weight materials. These higher molecular weights increase the amount of chain entanglements, thus increasing cohesive strength. Also, the distance between cross-links can be greater with high molecular syrup polymer, which allows for increased wet-out onto a surface.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the syrup.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

The polymerization is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution. Thus, the (e.g. pressure sensitive) adhesive can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime.

Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the syrup composition. Such polymerizable photoinitiators are described, for example, in U.S. Pat. Nos. 5,902,836 and 5,506,279 (Gaddam et al.).

Such photoinitiators preferably are present in an amount of from 0.1 to 1.0 part by weight, relative to 100 parts by weight of the total syrup content. Accordingly, relatively thick coatings can be achieved when the extinction coefficient of the photoinitiator is low.

The syrup composition and the photoinitiator may be irradiated with activating UV radiation to polymerize the monomer component(s). UV light sources can be of two types: 1) relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is typically at least 100,000 or 250,000 and preferably at least 500,000 g/mole or greater.

When preparing (meth)acrylic polymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

The pressure-sensitive adhesives may optionally contain one or more conventional additives. Preferred additives include tackifiers, plasticizers, dyes, antioxidants, UV stabilizers, and (e.g. inorganic) fillers such as (e.g. fumed) silica and glass bubbles.

In some embodiments, the pressure sensitive adhesive comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil"; Cabot under the trade designation "Cab-O-Sil", and Wacker Chemie-Dow Corning. The BET surface area of suitable fumed silica is typically at least 50 m$^2$/g, or 75 m$^2$/g, or 100 m$^2$/g. In some embodiments, the BET surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, such as for conformable pressure sensitive adhesives, the adhesive comprises at least 0.5, 1.0, 1.1, 1.2, 1.3, 1.4, or 1.5 wt-% of (e.g. fumed) silica and in some embodiments no greater than 5, 4, 3, or 2 wt-%. In other embodiments, the adhesive comprises at least 5, 6, 7, 8, 9, or 10 wt-% of (e.g. fumed) silica and typically no greater than 20, 19, 18, 17, 16, or 15 wt-% of (e.g. fumed) silica.

In some embodiments, the pressure sensitive adhesive comprises glass bubbles. Suitable glass bubbles generally have a density ranging from about 0.125 to about 0.35 g/cc. In some embodiments, the glass bubbles have a density less than 0.30, 0.25, or 0.20 g/cc. Glass bubbles generally have a distribution of particles sizes. In typical embodiments, 90% of the glass bubbles have a particle size (by volume) of at least 75 microns and no greater than 115 microns. In some embodiments, 90% of the glass bubbles have a particle size (by volume) of at least 80, 85, 90, or 95 microns. In some embodiments, the glass bubbles have a crush strength of at least 250 psi and no greater than 1000, 750, or 500 psi. Glass bubbles are commercially available from various sources including 3M, St. Paul, Minn.

The concentration of glass bubbles can vary. In some embodiments, the adhesive comprises at least 1, 2, 3, 4 or 5 wt-% of glass bubbles and typically no greater than 20, 15, or 10 wt-% of glass bubbles.

The inclusion of glass bubbles can reduce the density of the adhesive. Another way of reducing the density of the adhesive is by incorporation of air or other gasses into the adhesive composition. For example the (e.g. syrup) adhesive composition can be transferred to a frother as described for examples in U.S. Pat. No. 4,415,615; incorporated herein by reference. While feeding nitrogen gas into the frother, the frothed syrup can be delivered to the nip of a roll coater between a pair of transparent, (e.g. biaxially-oriented polyethylene terephthalate) films. A silicone or fluorochemical surfactant is included in the froathed syrup. Various surfactants are known including copolymer surfactants described in U.S. Pat. No. 6,852,781.

In some embodiments no tackifier is used. When tackifiers are used, the concentration can range from 5 or 10 wt-% to 40, 45, 50, 55, or 60 wt-% of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from C5 and C9 monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

Depending on the kinds and amount of components, the pressure sensitive adhesive can be formulated to have a wide variety of properties for various end uses.

In one specific embodiment, the adhesive composition and thickness is chosen to provide a synergistic combination of properties. In this embodiment, the adhesive can be characterized as having any one or combination of attributes including being conformable, cleanly removable, reusable, reactivatible, and exhibiting good adhesion to rough surfaces.

Thus, in some embodiments, the PSA is conformable. The conformability of an adhesive can be characterized using various techniques such as dynamic mechanical analysis (as determined by the test method described in the examples) that can be utilized to determine that shear loss modulus (G"), the shear storage modulus (G'), and tan delta, defined as the ratio of the shear loss modulus (G") to the shear storage modulus (G'). As used herein "conformable" refers to the (e.g. first) adhesive exhibiting a tan delta of at least 0.4 or greater at 25° C. and 1 hertz. In some embodiments, the (e.g. first) adhesive has tan delta of at least 0.45, 0.50, 0.55, 0.65, or 0.70 at 25° C. and 1 hefts. The tan delta at 25° C. and 1 hertz of the (e.g. first) adhesive is typically no greater than 0.80 or 1.0. In some embodiments, the tan delta of the (e.g. first) adhesive is no greater than 1.0 at 1 hertz and temperatures of 40° C., 60° C., 80° C., 100° C. and 120° C. In some embodiments, the first adhesive layer has tan delta of at least 0.4 or greater at 1 hertz and temperatures of 40° C., 60° C., 80° C., 100° C. and 120° C.

The PSA and adhesive coated articles can exhibit good adhesion to both smooth and rough surfaces. Various rough surfaces are known including for example textured drywall, such as "knock down" and "orange peel"; cinder block, rough (e.g. Brazilian) tile and textured cement. Smooth surfaces, such as stainless steel, glass, and polypropylene have an average surface roughness (Ra) as can be measured by optical inferometry of less than 100 nanometer; whereas rough surfaces have an average surface roughness greater than 1 micron (1000 nanometers), 5 microns, or 10 microns. Surfaces with a roughness in excess of 5 or 10 microns can be measured with stylus profilometry. Standard (untextured) drywall has an average surface roughness (Ra), of about 10-20 microns and a maximum peak height (Rt using Veeco's Vison software) of 150 to 200 microns. Orange peel and knockdown drywall have an average surface roughness (Ra) greater than 20, 25, 30, 35, 40, or 45 microns and a maximum peak height (Rt) greater than 200, 250, 300, 350, or 400 microns. Orange peel drywall can have an average surface roughness (Ra) of about 50-75 microns and a maximum peak height (Rt) of 450-650 microns. Knock down drywall can have an average surface roughness (Ra) greater than 75, 80, or 85 microns, such as ranging from 90-120 microns and a maximum peak height (Rt) of 650-850 microns. In typical embodiments, Ra is no greater than 200, 175, or 150 microns and Rt is no greater than 1500, 1250, or 1000 microns. Cinder block and Brazilian tile typically have a similar average surface roughness (Ra) as orange peel drywall.

Although many conformable adhesives exhibit good initial adhesion to a rough surface, the PSA and articles described herein can exhibit a shear (with a mass of 250 g) to orange peel dry wall of at least 500 minutes. In some embodiments, the PSA and articles can exhibit a shear (with a mass of 250 g) to orange peel dry wall of at least 1000, 2000, 3000, 4000, 5000, 6000, 7000, 8000, 9000 or 10,000 minutes.

The PSA and adhesive coated articles can be cleanly removable from paper. By "cleanly removable from paper" it is meant that the paper does not tear and the paper does not have any staining or adhesive residue after removal of the adhesive from the paper when tested (according to Test Method 3 set forth in the examples). The 90° peel values to paper (according to Test Method 3, set forth in the examples) is typically at least 25 and no greater than 200 or 175 N/dm. In some embodiments, the 90° peel value to paper no greater than 50, 45, or 40 N/dm.

The PSA and adhesive coated articles can be reusable. By reuseable it is meant that PSA and/or adhesive coated article can repeatedly be removed and readhered to paper at least 1, 2, 3, 4, or 5 times. In some embodiments, it can be readhered to paper at least 5, 10, 15, or 20 times while maintaining at least 80%, 85%, or 90% of the initial peel adhesion (according to the "Reusability" test further described in the examples).

Further, in some embodiments, the adhesive can be reactivatible, i.e. contaminants can be removed by cleaning the adhesive layer(s) with soap and water, such as by the test methods described in WO 96/31564; incorporated herein by reference.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. In some embodiments, the backing is comprised of a bio-based material such as polylactic acid (PLA).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Suitable primers include for example those described in EP 372756, U.S. Pat. No. 5,534,391, U.S. Pat. No. 6,893,731, WO2011/068754, and WO2011/38448.

In some embodiments, the backing material is a transparent film having a transmission of visible light of at least 90 percent. The transparent film may further comprise a graphic. In this embodiment, the adhesive may also be transparent.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. The composition may also be coated from the melt. These various methods of coating allow the compositions to be placed on the substrate at variable thicknesses thus allowing a wider range of use of the compositions. Coating thicknesses may vary as previously described. The syrup composition may be of any desirable concentration for subsequent coating, but is typically 5 to 20 wt-% polymer solids in monomer. The desired concentration may be achieved by further dilution of the coating composition, or by partial drying. Coating thicknesses may vary from about 25 to 1500 microns (dry thickness). In typical embodiments, the coating thickness ranges from about 50 to 250 microns. When the multilayer PSA or article is intended to be bonded to a rough surface, the thickness of the adhesive layer typically ranges from the average roughness (Ra) to slightly greater than the maximum peak height (Rt). The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner. Additional tape constructions include those described in U.S. Pat. No. 5,602,221 (Bennett et al.), incorporated herein by reference.

Objects and advantages of this invention are further illustrated by the following examples. The particular materials and amounts, as well as other conditions and details, recited in these examples should not be used to unduly limit this invention.

EXAMPLES

As used herein, all percentages and parts are by weight. Amounts of additives, e.g., crosslinkers, photoinitiator, tackifiers, etc. are expressed in parts per hundred resin (phr) in which 100 parts of the resin represents the weight of the monomers that form the polymer backbone, e.g., IOA, 2OA, AA.

The 500 mL jar was a quart jar.
Test Methods
Test Method 1: Shear Strength Test

Stainless steel (SS) plates were prepared for testing by cleaning with methyl ethyl ketone and a clean Kimwipe® tissue (Kimberly-Clark) three times. The adhesive films described were cut into strips (1.27 cm in width) and adhered by their adhesive to flat, rigid stainless steel plates with exactly 2.54 cm length of each adhesive film strip in contact with the plate to which it was adhered. A weight of 2 kilograms (4.5 pounds) was rolled over the adhered portion. Each of the resulting plates with the adhered film strip was equilibrated at room temperature for 15 minutes. Afterwards, the samples was transferred to a 70° C. oven, in which a 500 g weight was hung from the free end of the adhered film strip with the panel tilted 2° from the vertical to insure against any peeling forces. The time (in minutes) at which the weight fell, as a result of the adhesive film strip releasing from the plate, was recorded. The test was discontinued at 10,000 minutes if there was no failure. In the Tables, this is designated as 10,000+ minutes. Two specimens of each tape (adhesive film strip) were tested and the shear strength tests were averaged to obtain the reported shear value in Tables 1-7. In some cases, the samples were prepared and hung in the same fashion but at room temperature (RT) rather than 70° C. The temperature at which the test was carried out is indicated in each table.

Test Method 2: 180° Peel Adhesion Test

Peel adhesion was the force required to remove an adhesive-coated test specimen from a test panel measured at a specific angle and rate of removal. In the Examples, this force is expressed in ounces per inch width of coated sheet and the results are normalized to N/dm. The following procedure was used:

Peel adhesion strength was measured at a 180° peel angle using an IMASS SP-200 slip/peel tester (available from IMASS, Inc., Accord Mass.) at a peel rate of 305 mm/minute (12 inches/minute). Stainless steel (SS) test panels were prepared as described above. The cleaned panel was allowed to dry at room temperature. An adhesive coated film was cut into tapes measuring 1.27 cm×20 cm (½ in.×8 in.). A test sample was prepared by rolling the tape down onto a cleaned panel with 2 passes of a 2.0 kg (4.5 lb.) rubber roller. The prepared samples were dwelled at 23° C./50% RH for 15 minutes before testing. Four samples were tested for each example. The resulting peel adhesion was converted from ounces/0.5 inch to ounces/inch (N/dm) both values being reported in Tables 1-7.

Test Method 3: 90° Peel Adhesion Test 2 [ASTM D 3330/D 3330M-04]

Stainless steel (SS) substrates were cleaned as noted above. Two 1.0 inch (2.54 cm) by 3.0 inch (7.62 cm) strips of adhesive were laminated to a 5 mil (127 micrometers) aluminum foil backing for testing and were adhered to a stainless steel substrate (cleaned as described above) by rolling twice in each direction with a 6.8 kg roller onto the tape at 12 inches per minute (305 mm/min). The force required to peel the tape at 90° was measured after a 24 hour dwell at 25° C./50% humidity on an Instron (model number 4465). The measurements for the two tape samples were in pound-force per inch with a platen speed of 12 inches per minute (about 305 mm/min). The results were averaged and recorded in Table 8.

Test Method 4: Shear Strength Test 2 [ASTM D-3654/D 3654M 06, PSTC-107]-FOR SS 15

A stainless steel (SS) backing was adhered to a stainless steel (SS) substrate (cleaned as described above) and cut down to leave a 1.0 inch (2.54 cm) by 0.5 inch (1.27 cm) square for 158° F. (70° C.) temperature shear testing. A weight of was 1 kg was placed on the sample for 15 minutes. A 500 g load was attached to the tape sample for testing. Each sample was suspended until failure and/or test terminated. The time to failure was recorded. Samples were run in triplicate and averaged for Table 8 below.

Test Method 5—Determination of Yellowing

Isopropyl alcohol (IPA) was dispensed onto a 2 inch (5.08 cm) by 3 inch (7.62 cm) glass microscopic slide, wiped dry with a clean Kimwipe® tissue (Kimberly-Clark), repeated for a total of three washes with IPA and allowed to air dry. A 2 inch (5.08 cm) by 3 (7.62 cm) inch strip of adhesive tape with a release liner backing was adhered to the glass microscopic slide by rolling over the tape twice in each direction with a hand roller. Samples (with the protecting release liner removed) were then measured on a CIELAB color scale for b* using a Ultrascanpro® spectrophotometer (HunterLab, Reston, Va.). Samples were measured under four conditions and defined as follows:

1. Initial—adhesive measured with no UV or heat aging.
2. UV—adhesive exposed to 1.81 J/cm2 of UV A light from a fusion H bulb using a Model DRS-120 Fusion processor by Fusion UV Systems, Inc., Gaithersburg, Md., and measured after 24 hrs of UV exposure.
3. Heat—adhesive aged at 100° C. for 1 week in a Despatch LFD Series oven and measured 24 hours after removal from oven
4. UV and Heat—combination of UV (2) followed by Heat (3)

Samples were run in triplicate and averaged results are reported.

Test Method 6: 90°-Angle Peel Adhesion Test on Paper Surfaces

Cut out a 1 in (2.54 cm) wide and >3 in (7.62 cm) length specimen in the machine direction from the test sample. Remove the liner from one side of the adhesive and place it on an aluminum panel (2"×5"). Remove liner from other side of adhesive and place it on a strip of copy paper* (1 inch (2.54 cm) wide and >5 inches (7.62 cm)) using light finger pressure. Roll once in each direction with the standard FINAT test roller 4.5 lb (2 kg) at a speed of approx. at 12"/min. [305 mm]/min.). After applying the strips to the test panels, allow the panels samples to dwell at constant temperature and humidity (25° C./50% RH) room for 10 minutes before using an Instron tester. Fix the test panel and strip into the horizontal support. Set the machine at 305 mm per minute jaw separation rate. Test results were measured in gram force per inch and converted to Newtons per dm. The peel values are the average of three 90° angle peel measurements.

*The copy paper utilized is available from Boise™ under the trade designation "X-9" (92 brightness, 24 lb. (90 gsm/12M), 500 sheets, 8.5×11 (216 mm×279 mm)).

All the examples tested were cleanly removable from the copy paper unless specified otherwise, meaning that the paper did not tear and also did not have any staining or reside after removal of the adhesive.

Reusability can be determined by repeating Test Method 6 using the same adhesive sample with a fresh piece of paper each time wherein each reuse in considered a cycle.

Test Method 7: Static Shear Test on Dry Wall

Preparation of Drywall for Testing

The substrates employed were standard smooth drywall obtained from Home Depot (Woodbury, Minn.). Knockdown and orange-peel drywall was prepared by IUPAT (International Union of Painters and Allied Trades, 3205 Country Drive, Little Canada, Minn., USA). Drywall was primed using paint roller with Sherwin-Williams Pro-Mar 200. Surfaces were dried for a minimum of 4 hours at ambient conditions before applying next coat of paint. White paint (Valspar Signature, Hi-def Advanced Color, Eggshell Interior, #221399, Ultra White/Base A) was applied to primed drywall using a new paint roller and allowed to dry at ambient conditions until tackless before applying a second coat of the same color. Final painted drywall was dried overnight at ambient conditions and then placed into a 120° C. oven for 1 week. Samples were removed from oven and cut into desired dimensions using draw knife. Samples were dusted off using Kim wipes, tissue, paper towels, or air (no cleaning with solvents) to remove dust left over from cutting before use in testing.

A standard static shear test was performed at elevated temperature according to Pressure Sensitive Tape Council (Chicago, Ill./USA) PSTC-107 (procedure G). The test was performed at 70° F./50% Relative Humidity as called for by the method. The sample area of adhesive bonded to the prepared drywall surface was 2.54 cm in the vertical direction by 2.54 cm in the width direction (rather than 1.27 cm by 1.27 cm as called for by the method). Then a 6.8 kg weight was placed on top of the bonded sample area for 1 minute. After a dwell time of 60 seconds, the test specimen was hung in the shear stand at desired temperature and loaded immediately with a 250 g weight. The time to failure for the adhesive bond was recorded in minutes.

Test Method 8: Dynamic Mechanical Analysis

Examples 55 and 56 (at 25 mil thickness) were analyzed by Dynamic Mechanical Analysis (DMA) using a Discovery Hybrid parallel plate rheometer (TA Instruments) to characterize the physical properties of each sample as a function of temperature. Rheology samples were prepared by punching out a section of the PSA with an 8 mm circular die, removing it from the release liners, centering it between 8 mm diameter parallel plates of the rheometer, and compressing until the edges of the sample were uniform with the edges of the top and bottom plates. The furnace doors that surround the parallel plates and shafts of the rheometer were shut and the temperature was equilibrated at 20° C. and held for 1 minute. The temperature was then ramped from 20° C. to 125 or 130° C. at 3° C./min while the parallel plates were oscillated at an angular frequency of 1 Hertz and a constant strain of 5 percent. The results are depicted in FIG. 1.

Materials

Material suppliers are listed with the first usage of the material. If not specified, solvents and reagents can be obtained from Aldrich. Suppliers are listed in the examples as follows:

Aldrich—Sigma Aldrich, Milwaukee, Wis.

Alfa—Alfa Aesar, Ward Hill, Mass.

BASF—BASF Corporation, Florham Park, N.J.

EMD—EMD Chemicals, Gibbstown, N.J.

Dupont—E. I du Pont de Nemours and Company, Wilmington, Del.

Mitsubishi—Mitsubishi Polyester Film Inc., Greer, S.C.

TCI—TCI, Tokyo, Japan

VWR—VWR International, LLC., Radnor, Pa.

Preparatory Example 1

Citronellyl Acrylate (CiA)

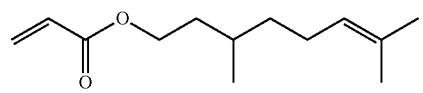

A mixture of β-citronellol (300.00 g, 1.92 mol; Aldrich), hexane (1500 mL), and triethylamine (212.49 g, 2.10 mol; Aldrich) was cooled in an ice bath. Acryloyl chloride (190.08 g, 2.10 mol; Aldrich) was added dropwise over 5 hours. The mixture was stirred for 17 hours at room temperature, and then filtered. The solution was concentrated under vacuum and washed with water. The solvent was removed under vacuum to provide a crude oil that was purified by vacuum distillation. A colorless oil (282.83 g of citronellyl acrylate) was collected at 70-75° C. at 0.30 mmHg.

Preparatory Example 2

Geraniol Acrylate (GrA,
[(2E)-3,7-dimethylocta-2,6-dienyl]prop-2-enoate)

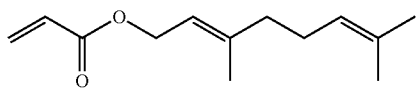

A 2-liter round bottomed flask fitted with an overhead stirrer, an addition funnel, and a condenser was charged with geraniol (195 g, 1.25 mol; Alfa), triethylamine (152 g, 1.50 mol), and methylene chloride (500 mL; EMD) and then cooled in an ice bath, and the mixture stirred. A solution of acryloyl chloride (124 g, 1.38 mol;) in methylene chloride (100 mL) was added dropwise over a 45 minute period. When addition was complete, the ice bath was removed and the reaction mixture was stirred at room temperature overnight. The reaction mixture was filtered to remove the precipitated salts and washed 2 times with 150 mL portions of a 10% solution of hydrochloric acid in water and 2 times with 150 mL portions of a saturated solution of sodium bicarbonate in water. The methylene chloride solution was dried over potassium carbonate, filtered, and the solvent was removed at reduced pressure. Phenothiazine (50 mg, 0.2 mmol; TCI) was added and the product was distilled at reduced pressure. Product was collected at a boiling range of 87 to 92° C. and a pressure range of 0.50 to 0.65 mm. NMR analysis of the distillate confirmed the structure as geraniol acrylate.

Preparatory Example 3

Farnesol Acrylate (FrA, [(2E,6E)-3,7,11-trimethyl-dodeca-2,6,10-trienyl]prop-2-enoate)

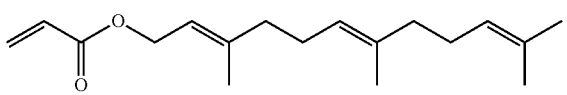 [SMILES: C=CC(=O)OC/C=C(\C)CC/C=C(\C)CCC=C(C)C]

Farnesol acrylate was prepared as described in Preparatory Example 2 except the reagents were farnesol (181 g, 0.81 mol; Alfa), triethylamine (99 g, 0.98 mol), methylene chloride (350 mL), and acryloyl chloride (81 g, 0.90 mol) in methylene chloride (90 mL). The resulting product was distilled and collected at a boiling range of 112 to 118° C. and a pressure range of 0.18 to 0.25 mm. NMR analysis of the distillate confirmed the structure as farnesol acrylate.

Preparatory Example 4

3-Cyclohexene Methyl Acrylate (CMA)

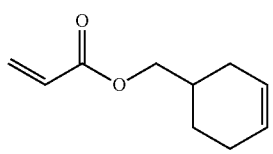

A mixture of 3-cyclohexene methanol (95.00 g, 0.85 mol; Aldrich), methylene chloride (300 mL), and triethylamine (94.11 g, 0.93 mol; EMD) was cooled in an ice bath. Acryloyl chloride (84.17 g, 0.93 mol) was added dropwise over 4 hours. The mixture was stirred for 17 hours at room temperature, then filtered. The solution was concentrated under vacuum, then diluted with ethyl acetate (500 mL; VWR). The solution was washed with saturated aqueous sodium bicarbonate and brine, then dried over magnesium sulfate. The solvent was removed under vacuum to provide a crude oil that was purified by vacuum distillation. A colorless oil (129.92 g of 3-cyclohexene methyl acrylate) was collected at 62-64° C. at 1.0 mm Hg.

Preparatory Example 5

Undecenyl Acrylate (UDA)

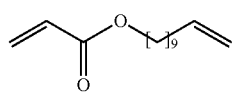

Undecenyl alcohol (69.66 g, 0.4090 mol; Alfa), toluene (300 mL), and triethylamine (45.53 g, 0.45 mol) were added to a 1000 mL 3-necked round bottomed flask. The solution was stirred and cooled to 0° C. in a nitrogen atmosphere. Acryloyl chloride (40.73 g, 0.45 mol) was added dropwise via addition funnel over a period of 4 hours. The cloudy yellow mixture was then slowly warmed to room temperature and placed on the rotary evaporator to remove the toluene. Ethyl acetate (300 mL) was added and the mixture was filtered through celite, washed with saturated sodium bicarbonate, and then the solvent was removed under vacuum. The crude yellow oil was purified by vacuum distillation. A faint yellow oil (55/75 g of 10-undecenyl acrylate) was collected at 90-96° C. @ 0.88 mm Hg.

Preparatory Example 6

Oleyl Acrylate (OA)

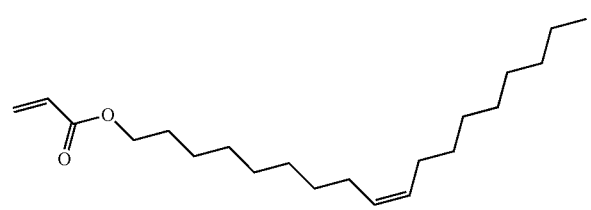 [SMILES: C=CC(=O)OCCCCCCCC/C=C\CCCCCCCC]

A mixture of oleyl alcohol (90.00 g, 0.34 mol; Alfa), methylene chloride (300 mL), and triethylamine (38.45 g, 0.38 mol) was cooled in an ice bath. Acryloyl chloride (34.89 g, 0.38 mol) was added dropwise over 2 hours. The mixture was stirred for 17 hours at room temperature, then filtered. The solution was concentrated under vacuum. The crude oil was loaded on a column of silica gel and eluted with hexane. The eluted solution was collected and concentrated under vacuum to provide a colorless oily liquid (68.25 g of oleyl acrylate).

Brij 02 Acrylate (Brij O2 A) was prepared according to US2012/0154811.

Examples 1-5 and Comparative Examples C1-C4

Compositions were prepared by charging a 500 mL jar with 270 g (90 wt. %) 2-octyl acrylate (2OA), 30 g (10 wt. %) of acrylic acid (AA; BASF), 0.12 g (0.04 phr) of photoinitiator 1 (2,2-dimethoxy-2-phenylacetophenone, Irgacure 651; BASF), and the amount in phr of one of the monofunctional acrylates (from the preparatory examples) as shown in Table 1. The monomer mixture was purged with nitrogen for 10 minutes then exposed to low intensity UV A light (less than 10 mW/cm$^2$, referred to as UV A because their output is primarily between 320 and 390 nm with a peak emission at around 350 nm which is in the UV A spectral region) until a coatable prepolymer syrup (Brookfield viscosity of 100-8000 cP) was formed, after which an additional 0.48 g (0.16 phr) of photoinitiator 1 was mixed into the composition.

The pre-adhesive (i.e. syrup) compositions were then coated on a release liner at a thickness of about 5 mil (127 micrometers) and cured under a nitrogen atmosphere by further exposure to UVA light from 350 BL light bulbs (40 watt, Osram Sylvania) as shown in Table 1 for various times to form a pressure sensitive adhesive (PSA). Total energies were measured using a Powermap™ radiometer equipped with a low intensity sensing head (available from EIT Inc., Sterling, Va.). The PSA was then laminated to a primed 2 mil poly(ethylene terpthalate) backing (trade designation Hostaphan 3 SAB PET film; Mitsubishi) to form a tape for adhesive testing.

Comparative Examples C1 and C2 were prepared as described above except that no crosslinker was added to the prior to the prepolymerization step. The amounts of 1,6-hexanediol diacrylate (HDDA) was mixed into the pre-adhesive formulations before coating and curing.

Comparative Examples C3 and C4 were prepared as described in C1 and C2 except that the crosslinker was 2,4,-bis(trichloromethyl)-6-(3,4-dimethoxyphenyl)-triazine (T1).

The adhesives were tested for shear adhesion at 70° C. and 180° peel adhesion. Results are shown in Table 1.

TABLE 1

| | Crosslinker | | | Total UV Exposure | 70° C. Shear | 180° Peel Adhesion to SS |
|---|---|---|---|---|---|---|
| Ex | Material | phr | (g) | mJ/cm$^2$ | (min) | (oz/in, N/dm) |
| 1 | CiA | 0.6 | 1.8 | 2540 | 10,000+ | 90.3, 98.6 |
| 2 | CiA | 0.8 | 2.4 | 2540 | 10,000+ | 92.9, 101.6 |
| 3 | CiA | 1.0 | 3.0 | 2540 | 10,000+ | 84.9, 92.9 |
| 4 | GrA | 0.6 | 1.8 | 1016 | 10,000+ | 91.1, 99.7 |
| 5 | FrA | 0.6 | 1.8 | 1016 | 8264 | 85.1, 93.1 |
| C1 | HDDA | 0.1 | 0.3 | 1016 | 3432 | 41.3, 45.2 |
| C2 | HDDA | 0.2 | 0.6 | 1016 | 5890 | 17.2, 18.8 |
| C3 | T1 | 0.1 | 0.3 | 593 | 10,000+ | 79.1, 86.2 |
| C4 | T1 | 0.2 | 0.6 | 4572 | 10,000+ | 74.3, 81.3 |

Examples 6-10, Comparative Examples C5-C8

Adhesive compositions and tapes were prepared and tested as described in Examples 1-5 except that 270 g (90 wt. %) of isooctyl acrylate (IOA) were used instead of 2OA and the crosslinkers in the amounts shown in Table 2 were used. Test results are shown in Table 2.

Adhesives tapes for Comparative Examples C5-C6 were prepared and tested as described in Comparative Examples C1-C2. Results are shown in Table 2.

Adhesives tapes for Comparative Examples C7-C8 were prepared as described in Comparative Examples C3-C4. Results are shown in Table 2.

TABLE 2

| | Crosslinker | | | Total UV Exposure | 70° C. Shear | 180° Peel Adhesion to SS |
|---|---|---|---|---|---|---|
| Ex | Material | phr | (g) | mJ/cm$^2$ | (min) | (oz/in, N/dm) |
| 6 | CiA | 1.0 | 3.0 | 2535 | 10,000+ | 66.9, 73.2 |
| 7 | GrA | 0.8 | 2.4 | 2535 | 10,000+ | 65.5, 71.7 |
| 8 | GrA | 1.0 | 3.0 | 2535 | 10,000+ | 73.9, 80.8 |
| 9 | FrA | 0.8 | 2.4 | 2535 | 10,000+ | 70.3, 77.0 |
| 10 | FrA | 1.0 | 3.0 | 2535 | 10,000+ | 66.5, 72.8 |
| C5 | HDDA | 0.1 | 0.3 | 2535 | 1463 | 68.9, 75.4 |
| C6 | HDDA | 0.2 | 0.6 | 2535 | 3481 | 64.5, 70.6 |
| C7 | T1 | 0.1 | 0.3 | 2535 | 10,000+ | 69.5, 76.0 |
| C8 | T1 | 0.2 | 0.6 | 2535 | 10,000+ | 67.6, 74.0 |

Examples 11-25

Adhesive compositions were prepared by charging an 8 ounce jar with 45 g of IOA, 5 g of AA, 0.02 g of photoinitiator 1 and the amounts and type of monofunctional acrylates (from preparatory examples) as shown in Table 3. The monomer mixture was purged with nitrogen for 5 minutes then exposed to UV A light from a low intensity black bulb (15 watt, 365 nm peak) until the viscosity increased and a coatable syrup was prepared.

An additional 0.08 g (0.16 phr) of the photoinitiator 1 was mixed into the syrup. The compositions were then knife-coated between clear release liners at a 5 mil (127 micrometers) thickness and cured by exposure to UV A light from 350 BL light bulbs (40 watt, Osram Sylvania) as shown in Table 3. Total UV exposure was measured with an Uvirad® Low Energy UV Integrating Radiometer (EIT, Inc., Sterling, Va.). Tapes were prepared as described in Examples 1-5, and tested for shear and peel adhesion. Results are shown in Table 3.

TABLE 3

| | Crosslinker | | | Total UV Exposure | 70° C. Shear | 180° Peel Adhesion to SS |
|---|---|---|---|---|---|---|
| Ex | Material | phr | (g) | mJ/cm$^2$ | (min) | (oz/in, N/dm) |
| 11 | CiA | 2.0 | 1.0 | 2189 | 10,000+ | 60.3, 66.0 |
| 12 | CiA | 5.0 | 2.5 | 2189 | 10,000+ | 43.1, 47.2 |
| 13 | CiA | 10.0 | 5.0 | 2189 | 10,000+ | 27.1, 29.6 |
| 14 | GrA | 2.0 | 1.0 | 2189 | 10,000+ | 66.7, 73.0 |
| 15 | GrA | 5.0 | 2.5 | 2189 | 10,000+ | 44.2, 48.4 |
| 16 | GrA | 10.0 | 5.0 | 2189 | 10,000+ | 23.4, 25.6 |
| 17 | FrA | 2.0 | 1.0 | 2189 | 10,000+ | 51.7, 56.6 |
| 18 | FrA | 5.0 | 2.5 | 2189 | 10,000+ | 40.7, 44.5 |
| 19 | FrA | 10.0 | 5.0 | 2189 | 10,000+ | 26.7, 29.2 |
| 20 | UDA | 1.0 | 0.5 | 1712 | 10,000+ | 51.2, 56.0 |
| 21 | UDA | 5.0 | 2.5 | 1712 | 10,000+ | 21.7, 23.7 |
| 22 | CMA | 1.0 | 0.5 | 1712 | 1092 | 75.6, 82.7 |
| 23 | CMA | 5.0 | 2.5 | 1712 | 10,000+ | 68.2, 74.6 |
| 24 | OA | 1.0 | 0.5 | 1186 | 10,000+ | 74.6, 81.6 |
| 25 | OA | 5.0 | 2.5 | 1186 | 10,000+ | 60.0, 65.6 |
| 26 | Brij O2 A | 1.0 | 0.5 | 1500 | 2098 | 76.1, 83.2 |
| 27 | Brij O2 A | 5.0 | 2.5 | 1500 | 10,000+ | 61.4, 67.1 |

Examples 28-33

Adhesives and tapes were prepared and tested as described in Examples 11-27 except that the monofunctional acrylate crosslinker was not added to the syrup composition, but mixed in prior to coating and curing. The amounts of crosslinker and test results are shown in Table 4.

TABLE 4

| | Crosslinker | | Total UV Exposure | 70° C. Shear | 180° Peel Adhesion to SS |
|---|---|---|---|---|---|
| Ex | Material | phr | (g) | mJ/cm² | (min) | (oz/in, N/dm) |
| 28 | CiA | 1.0 | 0.5 | 1422 | 10,000+ | 62.7, 68.6 |
| 29 | CiA | 2.0 | 1.0 | 1422 | 10,000+ | 51.2, 56.0 |
| 30 | GrA | 1.0 | 0.5 | 1422 | 10,000+ | 69.1, 75.6 |
| 31 | GrA | 2.0 | 1.0 | 1422 | 10,000+ | 54.9, 60.1 |
| 32 | FrA | 1.0 | 0.5 | 1422 | 10,000+ | 66.0, 72.2 |
| 33 | FrA | 2.0 | 1.0 | 1422 | 10,000+ | 52.9, 57.9 |

Examples 34-39

Compositions for Examples 34-37 were prepared by charging a 500 mL jar with 467.5 g (93.5 wt. %) of IOA, 32.5 g (6.5 wt. %) of AA, 0.2 g (0.04 phr) of photoinitiator 2 (trade designation Irgacure 184; BASF), and the amounts of CiA shown in Table 5. The monomer mixture was purged with nitrogen for 5-10 minutes then exposed to low intensity UV A radiation until a coatable syrup was formed.

An additional 1.75 g (0.16 phr) of photoinitiator 2 and 50 g (10 phr) of tackifier (trade designation Foral 85LB, Eastman Chemical Co., Kingsport, Tenn.) were then mixed into each composition. The compositions were then coated onto a release liner at 4 mil (101.6 micrometer) thickness and cured under a nitrogen atmosphere by exposure to UV A light from 350 BL light bulbs (40 watt, Osram Sylvania) followed by exposure to high intensity UV C light (greater than 10 mW/cm², referred to as UV C because the output of the bulbs is nearly monochromatic between 250 and 260 nm in the UV C spectral region) to form a PSA. Total UV exposure was measured as described for Examples 1-5 and is shown in Table 5. Tapes were prepared as in Examples 1-5 for adhesive testing.

Compositions and tapes for Example 38 were prepared and tested in the same manner as Example 35 except that 2OA was used instead of IOA. Test results for all tapes are shown in Table 5.

Compositions and tapes for Example 39 were prepared and tested as in Example 35 except the tackifier was trade designation Regalrez 6108 (Eastman Chemical Co., Kingsport, Tenn.) instead of trade designation Foral 85LB.

TABLE 5

| | Crosslinker | | Total UV Exposure mJ/cm² | 70° C. Shear | 180° Peel Adhesion to SS |
|---|---|---|---|---|---|
| Ex | Material | phr | (g) | (UVA + UVC) | (min) | (oz/in, N/dm) |
| 34 | CiA | 2 | 10 | 854 + 276 | 10,000+ | 59.5, 65.1 |
| 35 | CiA | 3 | 15 | 854 + 276 | 10,000+ | 49.6, 54.3 |
| 36 | CiA | 5 | 25 | 909 + 252 | 10,000+ | 25.1, 27.5 |
| 37 | CiA | 10 | 50 | 909 + 252 | 10,000+ | 18.0, 19.7 |
| 38 | CiA | 3 | 15 | 909 + 252 | 10,000+ | 43.8, 47.9 |
| 39 | CiA | 3 | 15 | 880 + 237 | 10,000+ | 45.1, 49.3 |

Examples 40-42

Compositions were prepared by charging a 500 mL jar with 420.8 g (93.5 wt %) of IOA, 29.3 (6.5 wt %) g of AA, 0.18 g (0.04 phr) of photoinitator 2 (trade designation Irgacure 184), and the amounts of CiA shown in Table 6. The monomer mixture was purged with nitrogen for 5-10 minutes then exposed to low intensity ultraviolet radiation until a coatable syrup was prepared.

An additional 1.58 g (0.16 phr) of photoinitiator 2, 45 g (10 phr) of tackifier (trade designation Foral 85LB), and the amounts of triazine T2 (2,4,-bis(trichloromethyl)-6-(4-methoxy)phenyl)-triazine) shown in Table 6 were mixed into the composition. The pre-adhesive (syrup) formulations were then coated onto a release liner at 4 mil (101.6 micrometer) thickness and cured under a nitrogen atmosphere by exposure to 883 mJ/cm² of UV A light from 350 BL light bulbs (40 watt, Osram Sylvania). Total UV exposure was measured as described in Examples 1-5. The PSA was then laminated to a primed poly(ethylene terpthalate) (PET, Mitsubishi Films) backing for adhesive testing.

TABLE 6

| | Crosslinker (CiA/T2) | | | 70° C. Shear | 180° Peel Adhesion to SS |
|---|---|---|---|---|---|
| Ex | Material | phr | (g) | (min) | (oz/in, N/dm) |
| 40 | CiA andT2 | 0.8/0.11 | 3.38/0.51 | 10,000+ | 60.9, 66.6 |
| 41 | CiA andT2 | 1.5/0.08 | 6.75/0.34 | 10,000+ | 54.2, 59.3 |
| 42 | CiA andT2 | 2.3/0.04 | 10.13/0.17 | 10,000+ | 48.5, 53.1 |

Examples 43-46

Compositions for Examples 43-45 were prepared by charging a 500 mL jar with 346.9 g (82.6 wt %) of IOA, 3.2 g (0.1 wt %) of AA, 0.14 g (0.04 phr) of photoinitiator1, and the amounts of CiA shown in Table 7. The monomer mixture was purged with nitrogen for 5-10 minutes then exposed to low intensity ultraviolet radiation to form a coatable syrup.

An additional 0.84 g (0.16 phr) of photoinitiator1, 0.26 g of antioxidant (Irganox 1076), 70 g (17 wt. %) of isobornyl acrylate (IBXA), and 100.8 g (24 phr) of tackifiers (trade designation Regalrez 6108) were added. The compositions were mixed thoroughly by rolling overnight and coated onto release liner at 5 mil (127 micrometer) thickness and cured under a nitrogen atmosphere by exposure to 827 mJ/cm² of UV A light followed by exposure to 236 mJ/cm² UV C light to form a PSA as described in Examples 34-39. Total UV exposure was measured as described in Examples 1-5. The PSA was then laminated to a primed poly(ethylene terpthalate) (PET, Mitsubishi Films) backing for adhesive testing. Results are shown in Table 7.

Compositions and tapes for Example 46 were prepared using 2OA instead of IOA.

TABLE 7

| | Crosslinker | | 70° C. Shear | 180° Peel Adhesion |
|---|---|---|---|---|
| Ex | Material | phr | (g) | (min) | to SS (oz/in, N/dm) |
| 43 | CiA | 3 | 10.5 | 19 | 71.6, 78.3 |
| 44 | CiA | 5 | 17.5 | 159 | 49.0, 53.6 |
| 45 | CiA | 10 | 35.0 | 10,000+ | 25.8, 28.2 |
| 46 | CiA | 3 | 10.5 | 63 | 71.8, 78.5 |

Examples 47-48 and Comparative Examples C9-C10

Example 47 was prepared by charging a 500 mL jar with 306.3 g (87.5 wt. %) IOA, 43.8 g (12.5 wt. %) of AA, 0.14 g (0.04 phr) of photoinitiator 1, and 2.1 g (0.6 phr) of CiA. The monomer mixture was purged with nitrogen for 10 minutes then exposed to low intensity UV A radiation until a coatable syrup was formed, after which another 0.67 g (0.16 phr) of photoinitiator1 was added. Next, 6.0 g (1.7 phr) of trade designation HDK H15 fumed silica (Wacker Silicones) were added and the syrup was mixed with a trade designation Netzsch Model 50 Dispersator. When the fumed silica was completely dispersed, 28 g (8 phr) of glass bubbles (K15, 3M Company, St. Paul Minn.) were added and the composition was mixed thoroughly by rolling overnight.

The composition was then coated between release liners at a 38 mil (965.2 micrometers) thickness and cured by 741 mJ/cm² of UV A light from 350 BL light bulbs (40 watt, Osram Sylvania) to form a PSA. Total UV exposure was measured as described in examples 1-5.

A composition and tape Example C9 were prepared as in Example 47 except that no CiA was added to the syrup composition, and 0.19 g (0.055 phr) HDDA was added to the syrup before coating.

A composition and tape for Example 48 were prepared as in Example 47 except the composition for the syrup was 315 g (90 wt. %) of 2OA, 35 g (10 wt %) of AA, 0.14 g (0.04 phr) of photoinitiator 1, and 3.5 g (1 phr) of CiA.

A composition and tape for Example C10 were prepared as in Example C9 except using the composition of Example 48.

Example 47-48 and C9-10 were prepared for adhesive testing and tested as outlined in the test methods 3 and 4.

TABLE 8

| Ex | Backbone Monomer | Crosslinker/phr | 70° C. Shear (min) | 90° Peel Adhesion to SS (lbf/in) |
|---|---|---|---|---|
| 47 | IOA | CiA/0.6 | 10,000+ | 23.5 |
| 48 | 2OA | CiA/1 | 10,000+ | 19.2 |
| C9 | IOA | HDDA/0.055 | 10,000+ | 23.1 |
| C10 | 2OA | HDDA/0.055 | 10,000+ | 22.4 |

Adhesive samples from Examples 3, 35-38, 40-42, and 45, and C3 were measured for yellowing as described above. Results are shown in Table 9.

TABLE 9

| Ex | Adhesive Thickness (mil) | b* Initial | b* UV | b* Heat | b* UV & Heat |
|---|---|---|---|---|---|
| 3 | 5 | 0.21 | 0.33 | 0.36 | 0.73 |
| 35 | 4 | 0.22 | 0.42 | 0.69 | 1.29 |
| 36 | 4 | 0.23 | 0.30 | 0.68 | 1.13 |
| 37 | 4 | 0.25 | 0.32 | 0.63 | 0.91 |
| 38 | 4 | 0.23 | 0.45 | 0.68 | 1.11 |
| 40 | 4 | 0.87 | 1.28 | 1.38 | 2.05 |
| 41 | 4 | 0.67 | 0.93 | 0.98 | 1.50 |
| 42 | 4 | 0.44 | 0.52 | 0.77 | 1.11 |
| 45 | 5 | 0.21 | 0.32 | 0.30 | 0.59 |
| C3 (T1) | 5 | 0.76 | 1.33 | 1.14 | 1.98 |

Examples 49-52 and C11

Adhesive composition and tape 49 was made by charging a glass bottle with 54 g (90 wt. %) 2OA, 6 g (10 wt. %) of AA, 0.6 g (1 phr) CiA, 0.06 g (0.1 phr) of Vazo 52 (Dupont), and 140 g ethyl acetate. This mixture was purged with nitrogen gas for 20 minutes, and the bottle was sealed and placed in a water bath at 52° C. with shaking for 20 hours. The bottle was then removed, and sparged with air for 1 minute. 30 g of the final polymer solution was combined a jar with 0.17 g (2 phr) of photoinitiator 1 and rolled to ensure thorough mixing. The composition was then coated at 5 mil (127 micrometers) thickness on 2 mil thick Mitsubishi Hostaphan 3SAB PET, and dried in an oven at 70° C. for 30 minutes. The dried adhesive was covered with a release liner and exposed to 982 mJ/cm² of UVA light over 10 minutes. Adhesive testing was then carried out according to test methods 1 and 2 except the shear strength test was carried out at room temperature rather than 70° C. Results are shown in Table 10.

Adhesive composition and tape 50 was made and tested in the same manner as example 46 except that the composition was 90 g (90 wt. %) 2OA, 10 g (10 wt. %) of AA, 2 g (2 phr) CiA, 0.04 g (0.04 phr) isooctyl thioglycolate, 0.1 g (0.1 phr) of Vazo 67 (Dupont), and 233.3 g ethyl acetate, and the cure was carried out with 762 mJ/cm² of UVA light over 10 minutes.

Adhesive composition 51 was made and tested in exactly the same way as composition 49 except that no photoinitiator was added. Adhesive composition 52 was made in exactly the same way as composition 50 except that no photoinitator was added.

Adhesive composition and tape C11 was made and tested in the same fashion as Example 49 except that the composition contained no CiA, and the cure was carried out with 2011 mJ/cm² of UVA light over 10 minutes.

TABLE 10

| Ex | Crosslinker Material | phr | (g) | Photo-initiator 1 phr | g | RT Shear (min) | 180° Peel Adhesion to SS (oz/in, N/dm) |
|---|---|---|---|---|---|---|---|
| 49 | CiA | 1 | 0.6 | 2 | 0.17 | 5,246 | 50.3, 55.1 |
| 50 | CiA | 2 | 2 | 2 | 0.17 | 5,285 | 58.9, 64.5 |
| 51 | CiA | 1 | 0.6 | 0 | 0 | 135 | 54.6, 59.8 |
| 52 | CiA | 2 | 2 | 0 | 0 | 342 | 71.4, 78.2 |
| C11 | N/A | N/A | N/A | 2 | 0.17 | 880 | 40.7, 44.6 |

Examples 53-56

Examples 53 and 54 were prepared by charging a 500 mL jar with 350 g (100 wt. %) 2OA, 0 g (0 wt. %) of AA, 0.14 g (0.04 phr) of photoinitiator 1, and a quantity of CiA according to Table 11. The monomer mixture was purged with nitrogen for 10 minutes then exposed to low intensity UVA radiation until a coatable syrup was formed, after which another 0.67 g (0.16 phr) of photoinitiator 1 was added. Next, 6.0 g (1.7 phr) of HDK H15 fumed silica (Wacker Silicones) was added and the syrup was mixed with a Netzsch Model 50 Dispersator. When the fumed silica was completely dispersed, 28 g (8 phr) of glass bubbles (K15, 3M Company, St. Paul Minn.) were added and the composition was mixed thoroughly by rolling overnight.

The composition was then coated at a 25 mil (635 micrometers) thickness between a release liner and a primed 2 mil polyethylene terepthalate (PET) and cured by a dose of UV A light (shown in Table 11) from 350 BL light bulbs (40 watt, Osram Sylvania) to form a PSA. Total UV exposure was measured as described in examples 1-5. Adhesive properties were tested according to test methods 6 and 7 and are shown in Table 11.

Examples 55 and 56 were made as described above except for the following: 1) the initial composition contained 300 g (100 wt. %) 2OA, 0 g (0 wt. %) of AA, 0.12 g (0.04 phr) of photoinitiator 1, and a quantity of CiA according to Table 11, 2) 0.57 g (0.16 phr) of photoinitiator 1, 5.1 g (1.7 phr) of HDKH15 fumed silica, and 24 g (8 phr) of glass bubbles were added after the prepolymer syrup was prepared. For rheological measurements, the coatable syrup was coated at 25 mil thickness and cured in the same manner.

TABLE 11

| Ex | Backbone Monomer | CiA (g) | CiA (phr) | UV Dose (mJ/cm²) | 70° C. Shear to Orange Peel Dry Wall (min) | 90° Peel Adhesion to Boise copy paper (lbf/in) |
|---|---|---|---|---|---|---|
| 53 | 2OA | 1.75 | 0.5 | 1482 | 275 | 4821.3 |
| 54 | 2OA | 3.5 | 1.0 | 1482 | 10,000+ | 3611.9 |
| 55 | 2OA | 4.11 | 1.37 | 2664 | 10,000+ | 2677.5 |
| 56 | 2OA | 5.49 | 1.83 | 2664 | 8790 | 2211.9 |

Examples 57-60

Adhesive compositions and tapes 57-60 were made and tested in exactly the same way as examples 11-25. The crosslinkers employed and adhesive properties are shown in Table 12. Dicyclopentenyl acrylate (DPA) was obtained from Monomer-Polymer Laboratories (Windham, N.H., USA). Ethylene glycol dicyclopentenyl ether acrylate (EGDA) was obtained from Aldrich.

TABLE 12

| Ex | Crosslinker Material | phr | (g) | Total UV Exposure mJ/cm² | 70° C. Shear (min) | 180° Peel Adhesion to SS (oz/in, N/dm) |
|---|---|---|---|---|---|---|
| 57 | EGDA | 0.5 | 0.25 | 2102 | 1,826 | 92.2, 100.9 |
| 58 | EGDA | 1.0 | 0.5 | 2102 | 10,000+ | 82.1, 89.9 |
| 59 | DPA | 0.5 | 0.25 | 1934 | 2,246 | 83.3, 91.2 |
| 60 | DPA | 1.0 | 0.5 | 1934 | 10,000+ | 85.8, 93.9 |

What is claimed is:

1. A pressure sensitive adhesive composition comprising:
   at least 50 wt-% of polymerized units derived from alkyl (meth)acrylate monomer(s) having a glass transition temperature no greater than 0° C.; and
   0.2 to 15 wt-% of at least one crosslinking monomer comprising a (meth)acrylate group and a $C_6$-$C_{20}$ olefin group, the olefin group being straight-chained or branched and optionally substituted; wherein the crosslinked composition is a pressure sensitive adhesive.

2. The pressure sensitive adhesive composition of claim 1 wherein the pressure sensitive adhesive comprises at least 70 wt-% of polymerized units derived from one or more alkyl (meth)acrylate monomer(s).

3. The pressure sensitive adhesive composition of claim 1 wherein the crosslinking monomer has the formula:

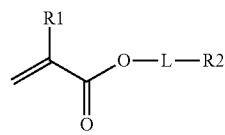

R1 is H or CH₃,
L is an optional linking group; and
R2 is an optionally substituted $C_6$-$C_{20}$ olefin group.

4. The pressure sensitive adhesive composition of claim 3 wherein L comprises one or more alkylene oxide groups.

5. The pressure sensitive adhesive composition of claim 3 wherein the crosslinking monomer is selected from the group consisting of citronellyl (meth)acrylate, geraniol (meth)acrylate, farnesol (meth)acrylate, and undecenyl (meth)acrylate.

6. The pressure sensitive adhesive composition of claim 1 wherein the crosslinking monomers comprises an olefin group comprising 6 to 10 carbon atoms.

7. The pressure sensitive adhesive composition of claim 1 wherein the pressure sensitive adhesive comprises a bio-based content of at least 25% of the total carbon content.

TABLE 13

| | Weight % of components of tackified and filled PSAs | | | | | |
|---|---|---|---|---|---|---|
| Example | Low Tg Monomer (2OA or IOA) wt-% | High Tg Monomer (AA and/or IBXA) wt-% | Crosslinking Monomer wt-% | Tackifier wt-% | Fumed Silica wt-% | Glass Bubbles wt-% |
| 34 | 83.2 | 5.8 | CiA - 1.8 | 8.9 | 0 | 0 |
| 35 | 82.5 | 5.7 | CiA - 2.6 | 8.8 | 0 | 0 |
| 36 | 81.0 | 5.6 | CiA - 4.3 | 8.7 | 0 | 0 |
| 37 | 77.7 | 5.4 | CiA - 8.3 | 8.3 | 0 | 0 |
| 38 | 82.5 | 5.7 | CiA - 2.6 | 8.8 | 0 | 0 |
| 39 | 82.5 | 5.7 | CiA - 2.6 | 8.8 | 0 | 0 |
| 40 | 84.0 | 5.9 | CiA/T2 - 0.7/0.1 | 9.0 | 0 | 0 |
| 41 | 83.5 | 5.8 | CiA/T2 - 1.3/0.07 | 8.9 | 0 | 0 |
| 42 | 83.0 | 5.8 | CiA/T2 - 2.0/0.03 | 8.9 | 0 | 0 |
| 43 | 65.2 | 13.7 | CiA - 2.0 | 18.9 | 0 | 0 |
| 44 | 64.3 | 13.6 | CiA - 3.2 | 18.7 | 0 | 0 |
| 45 | 62.3 | 13.1 | CiA - 6.3 | 18.1 | 0 | 0 |
| 46 | 65.2 | 13.7 | CiA - 2.0 | 18.9 | 0 | 0 |
| 47 | 79.1 | 11.3 | CiA - 0.5 | 0 | 1.6 | 7.2 |
| 48 | 81.1 | 9.0 | CiA - 0.9 | 0 | 1.5 | 7.2 |
| 53 | 90.5 | 0 | CiA - 0.5 | 0 | 1.6 | 7.2 |
| 54 | 90.1 | 0 | CiA - 0.9 | 0 | 1.5 | 7.2 |
| 55 | 89.8 | 0 | CiA - 1.2 | 0 | 1.5 | 7.2 |
| 56 | 89.5 | 0 | CiA - 1.6 | 0 | 1.5 | 7.2 |

8. The pressure sensitive adhesive composition of claim 1 wherein the pressure sensitive adhesive comprises polymerized units derived from 2-octyl (meth)acrylate.

9. The pressure sensitive adhesive composition of claim 1 wherein the pressure sensitive adhesive further comprises filler.

10. The pressure sensitive adhesive composition of claim 1 wherein the pressure sensitive adhesive composition further comprises polymerized units derived from at least one monomer selected from acid-functional monomers, non-acid functional polar monomers, vinyl monomers, and combinations thereof.

11. The pressure sensitive adhesive composition of claim 1 wherein the pressure sensitive adhesive further comprises a multifunctional (meth)acrylate crosslinker, a triazine crosslinker, or a combination thereof.

12. The pressure sensitive adhesive composition of claim 1 wherein the crosslinked pressure sensitive adhesive exhibits a storage modulus of less than $3\times10^6$ dynes/cm$^2$ at 25° C. and a frequency of 1 Hz.

13. The pressure sensitive adhesive composition of claim 1 wherein the pressure sensitive adhesive composition is cleanly removable from paper, or reusable, or has a shear to orange peel dry wall with a 250 g weight of at least 500 minutes, or a combination thereof.

14. A pressure sensitive adhesive article comprising the pressure sensitive adhesive composition of claim 1 disposed on a release liner.

15. A pressure sensitive adhesive article comprising the pressure sensitive adhesive composition of claim 1 on a backing.

16. An adhesive composition comprising a syrup comprising
   i) a free-radically polymerizable solvent monomer; and
   ii) a solute (meth)acrylic polymer comprising at least 50 wt-% of polymerized units derived from one or more alkyl (meth)acrylate monomers having a glass transition temperature no greater than 0° C.,
wherein the syrup comprises at least one crosslinking monomer or the (meth)acrylic solute polymer comprises polymerized units derived from at least one crosslinking monomer, the crosslinking monomer comprising a (meth)acrylate group and a $C_6$-$C_{20}$ olefin group, the olefin group being straight-chained, branched, or cyclic and optionally substituted; wherein the crosslinked adhesive composition is a pressure sensitive adhesive.

17. The adhesive composition of claim 16 wherein the adhesive is a pressure sensitive adhesive.

18. A method of preparing an adhesive composition comprising:
   a) providing a syrup according to claim 16; and
   b) applying the syrup to a substrate; and
   c) irradiating the applied syrup thereby crosslinking the adhesive composition.

19. A method of preparing an adhesive composition comprising:
   a) polymerizing in an organic solvent
      i) at least 50 wt-% of one or more alkyl meth(acrylate) monomer(s) having a glass transition temperature no greater than 0° C., and
      ii) a crosslinking monomer, the crosslinking monomer comprising a (meth)acrylate group and a $C_6$-$C_{20}$ olefin group, the olefin group being optionally substituted; and
   b) applying the solution of polymerized monomers to a substrate; and
   c) curing the solution thereby crosslinking the adhesive composition wherein the crosslinked adhesive composition is a pressure sensitive adhesive.

20. The pressure sensitive adhesive composition of claim 1 wherein the $C_6$-$C_{20}$ olefin group of the crosslinking monomer is an alkenyl group selected from 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl; 1,1-dimethyl-2-butenyl; 1,1-dimethyl-3-butenyl; 1,2-dimethyl-1-butenyl; 1,2-dimethyl-2-butenyl; 1,2-dimethyl-3-butenyl; 1,3-dimethyl-1-butenyl; 1,3-dimethyl-2-butenyl; 1,3-dimethyl-3-butenyl; 2,2-dimethyl-3-butenyl; 2,3-dimethyl-1-butenyl; 2,3-dimethyl-2-butenyl; 2,3-dimethyl-3-butenyl; 3,3-dimethyl-1-butenyl; 3,3-dimethyl-2-butenyl; 1,1,2-trimethyl-2-propenyl; cyclohexenyl, dicyclopentenyl, and isomers of heptenyl, octenyl, and nonenyl.

21. The pressure sensitive adhesive composition of claim 1 wherein the pressure sensitive adhesive composition further comprises a tackifier.

22. The pressure sensitive adhesive composition of claim 1 wherein the pressure sensitive adhesive composition comprises 0 to 1.0 wt-% of polymerized units derived from acid-functional monomers.

* * * * *

UNITED STATES PATENT AND TRADEMARK OFFICE
CERTIFICATE OF CORRECTION

PATENT NO. : 9,475,967 B2  
APPLICATION NO. : 14/767732  
DATED : October 25, 2016  
INVENTOR(S) : Lipscomb et al.

Page 1 of 2

It is certified that error appears in the above-identified patent and that said Letters Patent is hereby corrected as shown below:

On the Title Page

Column 1 item [72], (Inventors)
Lines 3-4, Delete "(Inner Grove Heights, MN) (US);" and insert -- Inver Grove Heights, MN (US); --, therefor.

Page 2 Column 2 item [56], (Other Publications)
Line 16, Delete "Sulifides." and insert -- Sulfides. --, therefor.

In the Specification

Column 1
Lines 6 and 7, Delete "PCT/US2014/23912, filed Jan. 30, 2013, which was published as WO 2013/033712 on April 11, 2014" and insert -- PCT/US2014/033712, filed on April 11, 2014, which was published as WO 2014/172185 on October 23, 2014; --.

Column 6
Line 43, Delete "substitutents." and insert -- substituents. --, therefor.

Column 10
Line 7, Delete "formula." and insert -- formula: --, therefor.
Lines 10-17, Delete

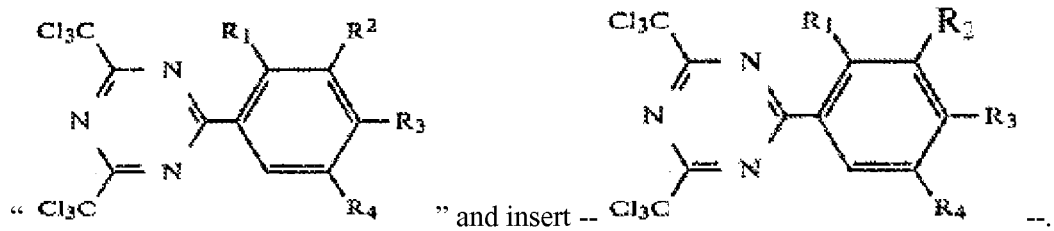 --.

Signed and Sealed this
Thirtieth Day of May, 2017

Michelle K. Lee
*Director of the United States Patent and Trademark Office*

CERTIFICATE OF CORRECTION (continued)
U.S. Pat. No. 9,475,967 B2

Column 15
Line 7, Delete "hefts." and insert -- hertz. --, therefor.
Line 23, Delete "inferometry" and insert -- interferometry --, therefor.
Line 30, Delete "Vison" and insert -- Vision --, therefor.

Column 19
Line 8, After "oven" insert -- . --.
Line 10, After "(3)" insert -- . --.

Column 22
Line 66, Delete "02" and insert -- O2 --, therefor.

Column 23
Line 27, Delete "terpthalate)" and insert -- terephthalate) --, therefor.
Line 28, Delete "3 SAB PET" and insert -- 3SAB PET --, therefor.

Column 26
Line 1, Delete "photoinitator" and insert -- photoinitiator --, therefor.
Line 15, Delete "terpthalate)" and insert -- terephthalate) --, therefor.
Line 24, Delete "CiA andT2" and insert -- CiA and T2 --, therefor.
Line 25, Delete "CiA andT2" and insert -- CiA and T2 --, therefor.
Line 26, Delete "CiA andT2" and insert -- CiA and T2 --, therefor.
Lines 47-48, Delete "terpthalate)" and insert -- terephthalate) --, therefor.

Column 28
Line 24, Delete "photoinitator" and insert -- photoinitiator --, therefor.
Lines 32-33, Delete "photoinitator 1" and insert -- photoinitiator 1 --, therefor.
Line 60, Delete "terpthalate" and insert -- terephthalate --, therefor.

In the Claims

Column 30
Line 38, Claim 6, Delete "monomers" and insert -- monomer --, therefor.